United States Patent
Rutsche et al.

(10) Patent No.: US 11,148,504 B2
(45) Date of Patent: Oct. 19, 2021

(54) FUEL-OPERATED VEHICLE HEATING DEVICE AND METHOD TO OPERATING A FUEL-OPERATED VEHICLE HEATING DEVICE

(71) Applicant: Webasto SE, Stockdorf (DE)

(72) Inventors: Andreas Rutsche, Stockdorf (DE); Vitali Dell, Stockdorf (DE); Matthias Pfau, Stockdorf (DE)

(73) Assignee: WEBASTO SE, Stockdorf (DE)

(*) Notice: Subject to any disclaimer, the term of this patent is extended or adjusted under 35 U.S.C. 154(b) by 205 days.

(21) Appl. No.: 16/464,373

(22) PCT Filed: Nov. 22, 2017

(86) PCT No.: PCT/EP2017/080006
§ 371 (c)(1),
(2) Date: May 28, 2019

(87) PCT Pub. No.: WO2018/099776
PCT Pub. Date: Jun. 7, 2018

(65) Prior Publication Data
US 2021/0114434 A1     Apr. 22, 2021

(30) Foreign Application Priority Data
Nov. 29, 2016  (DE) .................... 10 2016 123 041.3

(51) Int. Cl.
*B60H 1/22*      (2006.01)
*F23N 1/02*     (2006.01)

(52) U.S. Cl.
CPC ............. *B60H 1/2212* (2013.01); *F23N 1/02* (2013.01); *B60H 2001/2228* (2013.01); *B60H 2001/2284* (2013.01); *F23N 2241/14* (2020.01)

(58) Field of Classification Search
USPC .......................... 237/12.3 C; 431/12, 62, 6
See application file for complete search history.

(56) References Cited

U.S. PATENT DOCUMENTS 3,554,174 A * 1/1971 Clawson .................. F02M 1/00
123/556
3,584,459 A * 6/1971 Amann ...................... F02C 9/18
60/39.23

(Continued)

FOREIGN PATENT DOCUMENTS

DE        198 31 648 A1     1/2000
DE    10 2013 218 847 A1    3/2015

(Continued)

OTHER PUBLICATIONS

"EP_3054216_B1_M—Machine Translation.pdf", machine translation, EPO.org, Feb. 13, 2021. (Year: 2021).*

(Continued)

*Primary Examiner* — Steven B McAllister
*Assistant Examiner* — Daniel E. Namay
(74) *Attorney, Agent, or Firm* — Quarles & Brady LLP

(57) ABSTRACT

A method to operate a fuel-operated vehicle heater comprising the lowering of a combustion air ratio λ between supplied combustion air and supplied fuel to a combustion chamber of the fuel-operated vehicle heater from a starting value $\lambda_{start} > 1$ to a range $\lambda < \lambda_{start}$ for a time period $\Delta t$.

8 Claims, 2 Drawing Sheets

(56) References Cited

U.S. PATENT DOCUMENTS

Figure 1:
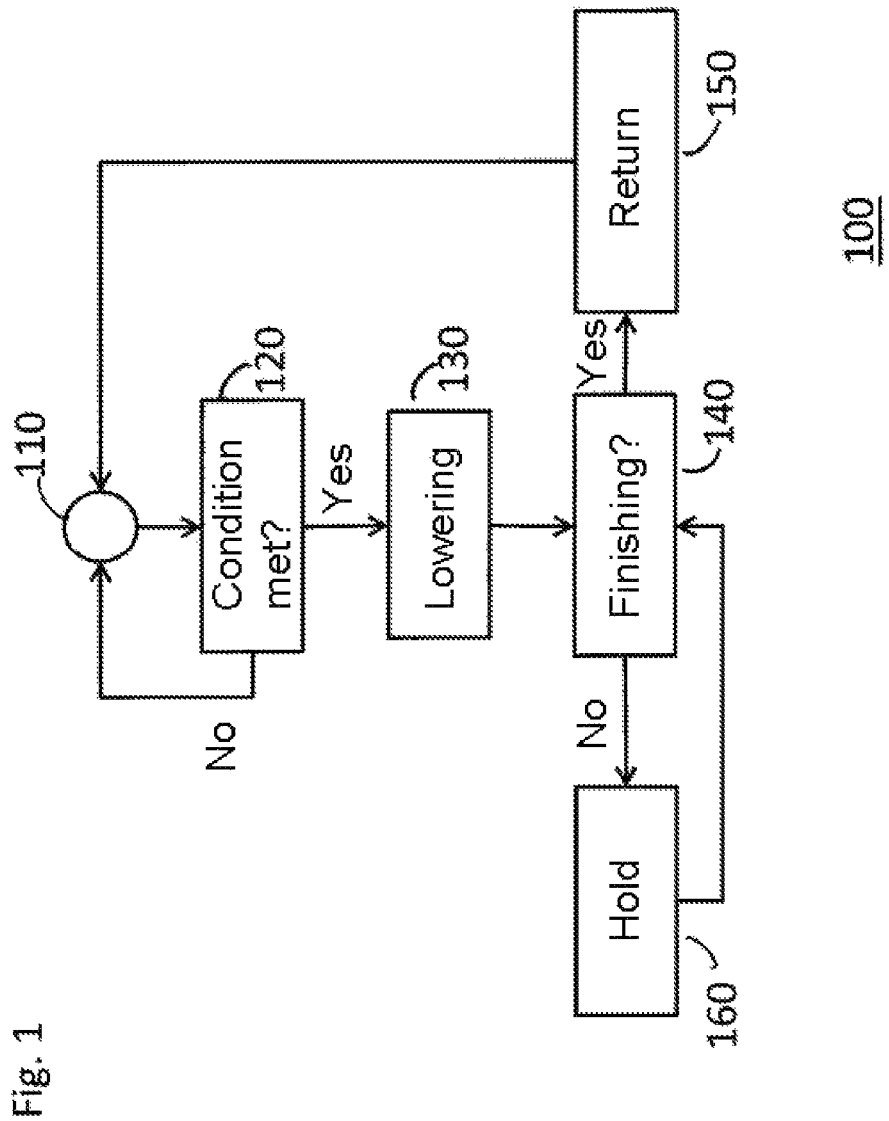

| | | | |
|---|---|---|---|
| 5,137,444 A | 8/1992 | Grebe et al. | |
| 5,213,492 A * | 5/1993 | Ho | F23N 5/003 431/10 |
| 5,242,295 A * | 9/1993 | Ho | F23G 5/16 431/10 |
| 5,899,683 A * | 5/1999 | Nolte | F23N 5/123 431/25 |
| 5,924,859 A * | 7/1999 | Nolte | F23N 1/022 431/12 |
| 6,887,069 B1 * | 5/2005 | Thornton | F23N 5/08 431/12 |
| 6,908,298 B1 * | 6/2005 | Dykema | F23D 14/22 431/8 |
| 8,484,951 B2 * | 7/2013 | Fuse | F01N 3/38 60/286 |
| 8,969,644 B2 * | 3/2015 | Olbert | F23C 6/045 585/658 |
| 2004/0123653 A1 * | 7/2004 | Benson | F23R 3/343 73/114.12 |
| 2005/0227129 A1 * | 10/2005 | Iio | H01M 8/0668 431/6 |
| 2005/0250061 A1 * | 11/2005 | Lochschmied | F23N 1/022 431/75 |
| 2005/0250062 A1 * | 11/2005 | Kornbluth | F23N 5/003 431/79 |
| 2011/0269081 A1 * | 11/2011 | Arnold | F23G 5/50 431/12 |
| 2013/0095436 A1 * | 4/2013 | Yamamoto | F23N 1/02 431/8 |
| 2013/0309617 A1 * | 11/2013 | Haneji | F23C 7/02 431/12 |
| 2014/0080075 A1 * | 3/2014 | Young | F23N 1/022 431/76 |
| 2014/0272737 A1 * | 9/2014 | Robertson | F23C 9/006 431/12 |
| 2015/0152809 A1 * | 6/2015 | Langenfeld | F01K 25/00 60/517 |
| 2017/0321893 A1 * | 11/2017 | Seeley | F23G 7/065 |
| 2019/0375273 A1 * | 12/2019 | Rutsche | B60H 1/2206 |

FOREIGN PATENT DOCUMENTS

| | | | |
|---|---|---|---|
| DE | 10 2014 103 814 A1 | 9/2015 | |
| EP | 0 225 655 A1 | 6/1987 | |
| EP | 0337408 A2 * | 10/1989 | ............ F23D 11/448 |
| EP | 1 717 514 A1 | 11/2006 | |
| EP | 2 116 771 A1 | 11/2009 | |
| EP | 3 054 216 A1 | 8/2016 | |
| WO | 2008/043347 A1 | 4/2008 | |

OTHER PUBLICATIONS

English translation of International Preliminary Report on Patentability dated Jun. 20, 2019 in connection with PCT/EP2017/080006.
English translation of International Search Report and Written Opinion dated Jan. 25, 2018 in connection with PCT/EP2017/080006.

* cited by examiner

FUEL-OPERATED VEHICLE HEATING DEVICE AND METHOD TO OPERATING A FUEL-OPERATED VEHICLE HEATING DEVICE

This application represents the national stage entry of PCT International Application No. PCT/EP2017/080006 filed Nov. 22, 2017 and claims priority to German Patent Application No. 10 2016 123 041.3 filed Nov. 29, 2016. The contents of these applications are hereby incorporated by reference as if set forth in their entirety herein.

The present disclosure relates to a fuel-operated vehicle heater and a method to operate the same.

Described is a method to operate a fuel-operated vehicle heater comprising the lowering of a combustion air ratio $\lambda$ between supplied combustion air and supplied fuel to a combustion chamber of the fuel-operated vehicle heater from a starting value $\lambda_{start} > 1$ to a range $\lambda < \lambda_{start}$ for a time period $\Delta t$. The combustion air ratio $\lambda$, also known as air ratio or air number, is the dimensionless ratio between the mass ratio of the supplied combustion air and the supplied fuel. A combustion air ratio $\lambda = 1$ describes a stoichiometric combustion, i.e., a complete combustion of the present fuel and the oxygen present in the combustion air. A value of $\lambda > 1$ denotes a lean fuel/combustion air mixture in which more combustion air is supplied than necessary for a complete combustion of the supplied fuel during the same time period. Lowering of the combustion air ratio $\lambda$ can, for example, take place during an ongoing operation of the fuel-operated vehicle heater, wherein the vehicle heater is in a stable stationary operating state until the combustion air ratio $\lambda$ is lowered. In this stable stationary operating state, the combustion air ratio $\lambda = \lambda_{start}$ may be constant. An example of stationary starting values $\lambda_{start}$ could be for example values between 1,5 and 2,0. The starting values $\lambda_{start}$ can also vary, for example, depending on a rated power of the fuel-operated vehicle heater. For example, a stationary starting value $\lambda_{start} = 1,8$ may be present in case of a fuel-operated vehicle heater having 15 kW and a stationary starting value $\lambda_{start} = 1,7$ may be present in the case of a fuel-operated vehicle heater having a rated power of 12 kW. The range $\lambda < \lambda_{start}$, to which the combustion air ratio $\lambda$ is lowered based on the stationary starting value $\lambda_{start}$, can therefore be for example 1,1 to 1,4. In particular, the range to which the combustion air ratio $\lambda$ is lowered from the starting value $\lambda_{start}$ is completely above $\lambda = 1$. Compared with the starting value $\lambda_{start}$, a comparatively rich fuel/combustion air ratio is available after the lowering of the combustion air ratio $\lambda$. This comparatively rich fuel/combustion air mixture is suitable for burning off residues deposited in the combustion chamber, such as coke or soot, and thus degrading them. The described method is therefore suitable for regenerating the vehicle heater, as the combustion chamber is freed from residues that accumulate over time. In this way, a possible malfunction of the fuel-operated vehicle heater caused by formation of residues in the combustion chamber can be prevented. Such malfunctions may include increased carbon monoxide emissions, increased soot particle emissions and/or increased noise during operation of the fuel-operated vehicle heater. Furthermore, the residues in the combustion chamber can also lead to a poor starting behavior, i.e., poor ignition behavior of the fuel-operated vehicle heater, so that increased exhaust emissions and soot particle emissions can be caused especially during a starting phase. This can lead to a complete failure of the fuel-operated vehicle heater, in which starting of the fuel-operated vehicle heater repeatedly fails due to the formation of residues in the combustion chamber.

The above-mentioned problems are solved or reduced by the described method.

Advantageously, it may be provided that the combustion air ratio $\lambda$ is maintained in a constant value range in the range $\lambda < \lambda_{start}$ during the time interval $\Delta t$. By maintaining the combustion air ratio $\lambda$ in the constant value range during the time interval $\Delta t$, a controlled and, in particular, uniform combustion of the residues in the combustion chamber can be achieved. The length of the time interval can be experimentally determined and preset in advance for the respective type of fuel-operated vehicle heater. It is also conceivable to determine the length of the time interval $\Delta t$ dynamically on the basis of the amount of residue deposit in the combustion chamber. Conclusions on the amount of residue deposited in the combustion chamber can, for example, be drawn indirectly from the starting behavior of the fuel-operated vehicle heater. For this purpose, for example, temperature and exhaust emission values can be monitored during the starting phase of the fuel-operated vehicle heater and, in the event of an unfavorable cause, an extension of the time interval $\Delta t$ can be noted during the next pending lowering of a combustion air ratio $\lambda$ in the constant value range. The constant value range can, for example, be defined around a preferred target value $\lambda_{target}$. It is possible that the combustion air ratio $\lambda$ is kept at the constant target value $\lambda_{target}$ instead of the constant value range.

It may be useful to provide that the combustion air ratio $\lambda$ is returned to a final value range of the combustion air ratio with $\lambda > 1$ subsequent to the time interval $\Delta t$. In this way, the fuel-operated vehicle heater is essentially returned to its original normal operation state after completed regeneration, i.e., the completion of the combustion of the residues in the combustion chamber. The end value range can preferably include the starting value $\lambda_{start}$. It is possible that the combustion air ratio $\lambda$ is returned to the starting value $\lambda_{start}$.

Furthermore, it may be provided that the length of the time interval $\Delta t$ is between 2 minutes and 5 minutes. Preferably, the time interval $\Delta t$ can be 4 minutes. In the time interval mentioned above, which is between 2 and 5 minutes, a complete combustion of the residues in the combustion chamber is usually to be expected. The regeneration of the fuel-operated vehicle heater is thus essentially finished and complete after the time interval $\Delta t$ has elapsed.

It may be advantageous to provide that an amount of combustion air supplied to the combustion air chamber is reduced and/or an amount of fuel supplied to the combustion air chamber is increased. By reducing the amount of supplied combustion air and by increasing the amount of supplied fuel, either individually or collectively, the desired reduction of the combustion air ratio $\lambda$ can be achieved in the range $\lambda < \lambda_{start}$.

It may be useful to provide that the amount of combustion air supplied to the combustion chamber and/or the amount of fuel supplied to the combustion chamber being determined depending on an air pressure detected by a sensor. By changing the air pressure, the air mass supplied to the combustion chamber changes, without the supplied air volume experiencing a change. This can be compensated for by varying the amount of supplied air and the amount of supplied fuel as a function of the recorded air pressure, so that the desired combustion air ratio $\lambda$ is reliably maintained.

Furthermore, it may be provided that the lowering of the combustion air ratio $\lambda$ to the range $\lambda < \lambda_{start}$ is initiated based on an operating time of the vehicle heater since the last lowering and/or terminated based on an air pressure detected by the sensor. By connecting the lowering of the combustion air ratio λ to the operating time of the vehicle heater since the last lowering, an essentially cyclic regeneration of the fuel-operated vehicle heater is achieved. When a fuel-operated vehicle heater is put into operation for the first time, the time of the first start-up can be regarded as the time of the last lowering because the combustion chamber is free of residues at this time. Furthermore, it may be provided that a regeneration of the fuel-operated vehicle heater is carried out after a fixed period of time, i.e., once a year, irrespective of the operating time. Stopping the lowering process based on a recorded air pressure can prevent an undesired drop of the desired combustion air ratio λ below the targeted constant value $\lambda_{target}$ at higher altitudes during the lowering process. This can happen, for example, if the vehicle travels a greater height difference while the combustion air ratio λ is being lowered, for example on a mounting pass, and less combustion air is supplied to the combustion air chamber due to the resulting drop in air pressure.

Also described is a a fuel-operated vehicle heater with a control unit configured to perform the method described above.

The disclosure described above is now explained by way of example with reference to the accompanying drawings using a preferred design.

Figure 2:
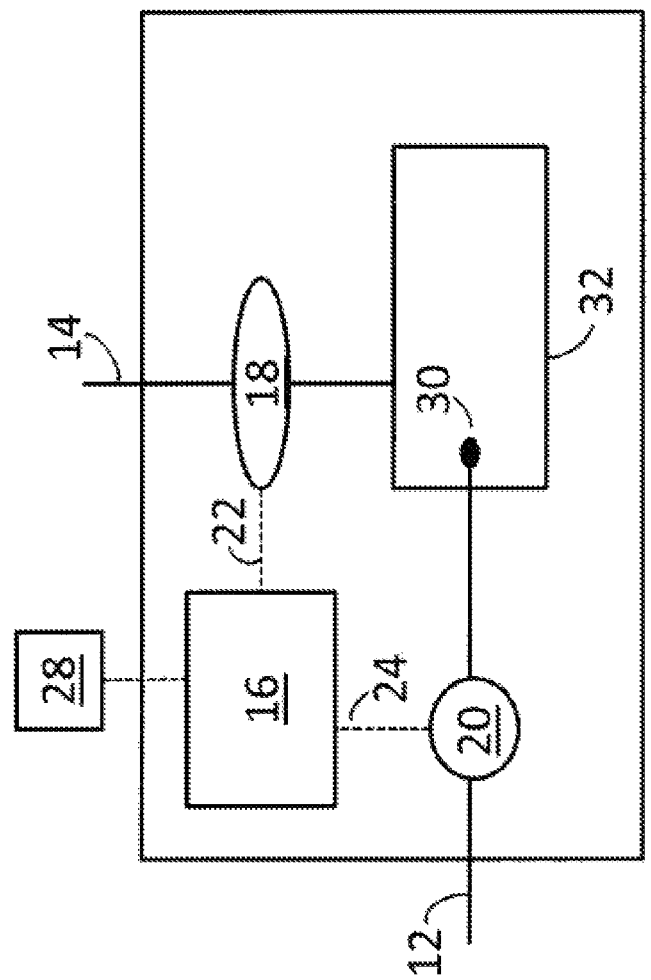

FIG. 1 a flow diagram of a method for operating a fuel-operated vehicle heater; and FIG. 2 a schematic representation of a fuel-operated vehicle heater.

FIG. 1 shows a flow diagram of a method for operating a fuel-operated vehicle heater. The described method 100 starts at start 110. Starting from the start 110, the system checks whether a condition is met, step 120. For example, the operating time of the vehicle heater since the last lowering can be used as a condition. Furthermore, the time totally elapsed since the last lowering can also be used as a condition. The possible operating time between two lowering phases can, for example, be between 8 and 30 hours. The operating time can preferably be between 8 and 12 hours, with 10 hours being the preferred operating time until the next lowering. The maximum time period between two lowerings can, for example, be 1 year. If the condition is not met, step 120-no, it is resumed at start 110. If the condition is met, step 120-yes, it is continued with a lowering at step 130. In addition to the conditions explicitly mentioned in connection with FIG. 1, i.e., the operating time of the vehicle heater since the last lowering and the maximum time period since the last lowering, other conditions mentioned elsewhere in this description can also be used to initiate the lowering. At step 130, the combustion air ratio λ is lowered from a starting value of $\lambda_{start}>1$ to a value range of $1<\lambda<\lambda_{start}$. The starting value $\lambda_{start}$ can, for example, be 1,7 or 1,8. The value range $1<\lambda<\lambda_{start}$, to which the value is lowered, can be, for example, the range from 1,1 to 1,5. Preferably, the lowering can be carried out to a constant value $\lambda_{target}$. $\lambda_{target}$ can, for example, be 1,2. The lowering of the combustion air ratio π can, for example, be achieved by reducing the supplied combustion air. This can, for example, be achieved by throttling the air supply or reducing a fan speed, whereby the fan supplies combustion air to the combustion chamber. It is also possible to change the amount of supplied fuel, for example, by increasing the delivery rate of a fuel pump. In this way, the combustion air ratio can also be shifted to the desired range. The reduction of the supplied combustion air has the advantage over an increase in the amount of fuel supplied that the heating power of the fuel-operated vehicle heater remains almost constant during the lowering phase, as the amount of supplied fuel remains essentially unchanged. The lowering can essentially be achieved almost stepwise by directly switching the appropriate suppliers for combustion air and/or fuel to the desired values. Subsequent to the lowering, it can be checked at step 140, whether the initiated lowering phase shall be terminated. A corresponding criterion is, for example, the expiry of a time interval Δt, which can start with the beginning of the lowering at step 130. The length of the time interval Δt can be between 2 and 5 minutes, preferably 4 minutes. A further criterion for terminating the lowering phase can be the air pressure in the vicinity of the vehicle heater, since a lower air mass is supplied to the combustion chamber when the air pressure drops with otherwise constant operation of the combustion air supplier. If the lowering phase is not yet to be terminated, step 140-no, essentially only the previous operating state is maintained, i.e., the regeneration is continued, in a subsequent step 160. From this point, it is checked again whether the lowering phase should be terminated, step 140. If there is a condition for ending the lowering phase, step 140-yes, the vehicle heater is returned to its original operating state in a subsequent step 150. This can be done, for example, by increasing the amount of supplied combustion air and/or reducing the amount of supplied fuel to the original initial values, depending on how the lowering was previously carried out. The method 100 can then be restarted or continued at step 110.

FIG. 2 schematically shows a fuel-operated vehicle heater 10. The fuel-operated vehicle heater 10 has a fuel line 12 and a combustion air line 14 via which fuel and combustion air are supplied to the fuel-operated vehicle heater respectively. The supplied fuel can be dosed by a fuel pump 20 and supplied to a combustion chamber 32. A nozzle 30 is arranged in the combustion chamber 32 and serves to spray the supplied fuel. The combustion air supplied to the fuel-operated vehicle heater 10 can also be supplied to the combustion chamber 32 via an air control device 18, for example a blower and/or a throttle device. Within the combustion chamber, the sprayed fuel and the supplied combustion air form a fuel/combustion air mixture with a combustion air ratio λ depending on the fuel and air mass supplied per time unit. The combustion air ratio λ can be adjusted via a control unit 16 which controls the air control device 18 via a control line 22 and the fuel pump 20 via a further control line 24. An exhaust gas discharge of the fuel-operated vehicle heater is not explicitly shown in FIG. 2, but is undoubtedly present. In the exhaust gas discharge likewise not shown sensors can be present, which can supervise for example exhaust gas emission values of the fuel-operated vehicle heater, for example the soot number and the carbon monoxide load. FIG. 2 shows a sensor 28 that can, for example, detect an ambient pressure in the vicinity of the fuel-operated vehicle heater 10. The control unit 16 can in particular be configured to carry out the method described above.

The features disclosed in the above description, in the drawings and in the claims may be essential for the realization of an invention, either individually or in any combination.

REFERENCE NUMERALS 10 vehicle heater
12 fuel line
14 combustion air line 16 control unit
18 air control device
20 fuel pump
22 control line
24 further control line
28 sensor
30 nozzle
32 combustion chamber
100 method
110 start
120 condition met?
130 lowering
140 finishing?
150 return
160 hold

The invention claimed is:

1. A method to operate a fuel-operated vehicle heater comprising the lowering of a combustion air ratio $\lambda$ between supplied combustion air and supplied fuel to a combustion chamber of the fuel-operated vehicle heater from a starting value $\lambda_{start}>1$ to a range $\lambda<\lambda_{start}$ start for a time period $\Delta t$, wherein the lowering of the combustion air ratio $\lambda$ starts during stable steady-state operation of the fuel-operated vehicle heater, wherein the combustion air ratio $\lambda$ is returned to a final value range of the combustion air ratio with $\lambda>1$ subsequent to the time interval $\Delta t$, and wherein the lowering of the combustion air ratio $\lambda$ to the range $\lambda<\lambda_{start}$ is initiated based on an operating time of the vehicle heater since the last lowering and/or is terminated based on an air pressure detected by a sensor.

2. The method according to claim 1, wherein the combustion air ratio $\lambda$ is maintained in a constant value range in the range $\lambda<\lambda_{start}$ during the time interval $\Delta t$.

3. The method according to claim 1, wherein the combustion air ratio $\lambda$ is returned to a final value range of the combustion air ratio with $\lambda>1$ subsequent to the time interval $\Delta t$.

4. The method according to claim 1, wherein the length of the time interval $\Delta t$ is between 2 minutes and 5 minutes.

5. The method according to claim 1, wherein an amount of combustion air supplied to the combustion air chamber is reduced and/or an amount of fuel supplied to the combustion air chamber is increased.

6. The method according to claim 5, wherein the amount of combustion air supplied to the combustion chamber and/or the amount of fuel supplied to the combustion chamber being determined depending on an air pressure detected by a sensor.

7. The method according to claim 1, wherein the lowering of the combustion air ratio $\lambda$ to the range $\lambda<\lambda_{start}$ is initiated based on an operating time of the vehicle heater since the last lowering and/or terminated based on an air pressure detected by the sensor.

8. A fuel-operated vehicle heater having a control unit configured to perform the method according to claim 1.

* * * * *

UNITED STATES PATENT AND TRADEMARK OFFICE
CERTIFICATE OF CORRECTION

PATENT NO. : 11,148,504 B2
APPLICATION NO. : 16/464373
DATED : October 19, 2021
INVENTOR(S) : Andreas Rutsche et al.

It is certified that error appears in the above-identified patent and that said Letters Patent is hereby corrected as shown below:

In the Specification

Column 3, Line 58, "ratio $\pi$ can" should be --ratio $\lambda$ can--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*